(12) United States Patent
Heron et al.

(10) Patent No.: US 6,690,393 B2
(45) Date of Patent: Feb. 10, 2004

(54) 3D ENVIRONMENT LABELLING

(75) Inventors: Dale R. Heron, Crawley (GB); Christopher Thorne, Horley (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 412 days.

(21) Appl. No.: 09/741,924

(22) Filed: Dec. 20, 2000

(65) Prior Publication Data

US 2002/0054129 A1 May 9, 2002

(30) Foreign Application Priority Data

Dec. 24, 1999 (GB) ................................. 9930850

(51) Int. Cl.$^7$ ............................................. G06F 15/00
(52) U.S. Cl. ........................................ 345/757; 345/848
(58) Field of Search ................................. 345/757, 782, 345/836, 848–852

(56) References Cited

U.S. PATENT DOCUMENTS

| | | | | |
|---|---|---|---|---|
| 5,526,478 A | * | 6/1996 | Russell et al. | 715/512 |
| 5,708,764 A | | 1/1998 | Borrel et al. | |
| 5,801,704 A | * | 9/1998 | Oohara et al. | 345/856 |
| 6,172,680 B1 | * | 1/2001 | Wong et al. | 345/581 |
| 6,219,045 B1 | * | 4/2001 | Leahy et al. | 345/757 |
| 6,313,836 B1 | * | 11/2001 | Russell et al. | 345/419 |
| 6,362,817 B1 | * | 3/2002 | Powers et al. | 345/419 |
| 6,473,751 B1 | * | 10/2002 | Nikolovska et al. | 707/3 |

OTHER PUBLICATIONS

Kutulakos et al., "Calibration–Free Augmented Reality", IEEE transactions on Visualization and Computer Graphics, US, IEEE, Service Center, vol. 4, No. 1, 1998, pp. 1–20, XP000752818.

The VRML Consortium Inc, "VRML–The Virtual reality Modelling Language, ISO/IEC 14772–1: 1997", International Standard ISO/IEC, 1997, pp. 1–236, XP000926300.

R. Darken, "Hands–Off Interaction with Means in Virtual Spaces", Proc. SOIE—The International Society for Optical Engineering, vol. 2177, pp. 365–371, 1994.

* cited by examiner

*Primary Examiner*—Cao (Kevin) Nguyen
(74) *Attorney, Agent, or Firm*—Gregory L. Thorne

(57) ABSTRACT

Objects of a three dimensional (3D) virtual world that are represented on a two dimensional (2D) image plane are provided with labels which are generated in the 2D image plane itself. The labels are in spatial registration with the object as represented on the 2D image plane. The generation of the labels in the 2D image plane avoids problems relating to perspective and aliasing which can occur when labels are provided in the virtual world itself and are rendered from the 3D virtual world.

17 Claims, 2 Drawing Sheets

3D ENVIRONMENT LABELLING

The present invention relates to a method and apparatus of providing identification labels or the like for objects in virtual environments, and in particular to the generation of such labels for display.

One common technique for allowing a user to explore a three dimensional (3D) virtual environment is to provide the user with a two dimensional (2D) display 'window' which gives the user a view into the environment.

While the virtual environment is stored in the form of data that expresses the environment in three dimensions, this data is processed to provide the user with a two dimensional view such that the user sees a representation of the three dimensional virtual environment as though from a particular viewpoint. As the user explores the environment this viewpoint changes. This process of projecting a 3D representation into a 2D view is sometimes referred to as rendering.

As a user navigates such a 3D environment various objects may be encountered. As the objects are encountered it is often desirable for information relating to the object to be revealed to the user, such as the identity of the object, supplementary information relating to the object or even information that is being fed back to the user as a result of his interaction with the object.

One known approach for providing such information to a user is to display the information in the form of a label which is united with the object as it exists in the 3D virtual environment. This approach has the advantage that the labels are in spatial registration with the object they are associated with, which can avoid confusion when more than one object appears in the view at a given time. Indeed, the Virtual Reality Modelling Language (VRML), as described, for example, in the VRML standard, version 2, issued as ISO/IEC WD 14772 on Aug. 4, 1996 allows for 'text nodes', which allow such textual labelling in the 3D environment/database. However, since these labels are native to the virtual world itself they can sometimes become difficult to read for a number of reasons.

The first problem occurs when the label is fixed with respect to the object. If an object is viewed from a perspective that is not directly front on, the text label will not be directly facing the viewpoint. As a result the text may be displayed as viewed from an angle such that the text is illegible through excessive skewing of the text characters or a masking of some text characters by other text characters. Should the object be viewed from behind, the text will be displayed from the rear which also makes it difficult to read. A second problem that can be encountered is that of aliasing; the effect of diagonal features of text characters assuming a 'staircase'-like appearance due to discretisation of the texture map of the text label of the rendering process itself. Although this effect is tolerable when characters are viewed directly face on, the effect is exaggerated when the text is viewed at an angle which creates an unpleasant appearance and diminishes the legibility of the text. A third problem can occur when the virtual world is recreated on a display that operates in an interlaced mode, which is the mode used by a normal television display. This type of operation gives rise to an effect known as interlace flicker which is particularly noticeable at horizontal boundaries of displayed items, such as the top and bottom of text.

It is an object of the present invention to provide a method and apparatus supporting enhancement in the provision of labels associated with objects defined in a three dimensional virtual environment.

In accordance with a first aspect of the present invention there is provided a method of providing labels for objects defined in a three-dimensional (3D) virtual environment, the objects being presented on a two dimensional (2D) image plane through projecting those objects onto the 2D image plane in a rendering process, to generate an image that is representative of the 3D environment as observed from a viewpoint, said method comprising the steps of:

establishing a location for an object as presented in the 2D image plane and assigning an object position reference point relative thereto; and generating a two dimensional (2D) label image which is associated with the object position reference point and movable therewith in two dimensions.

Because the label is generated as a two dimensional image rather than through a process of projecting a label from the 3D virtual environment, the label is always presented to directly face the user irrespective of the orientation of the object it is associated with as perceived from the users viewpoint. Such a generation method overcomes the above mentioned perspective issue which can lead to difficulty in displaying labels that are easy to read.

In a preferred implementation the two dimensional label images are generated in a two dimensional overlay plane which overlays the image plane containing the 3 dimensional rendered scene.

The method may further include the step of establishing the location of an object as presented in the 2D image plane through providing a bounding box sized to surround the associated object as defined in the 3D virtual environment, establishing the centre of the bounding box and projecting the location of the centre onto the 2D image plane in a rendering process to generate a position therein that is representative of the object location as observed from the viewpoint. Once such a position has been established, it is possible to provide an additional offset, such as a vertical offset to allow the label to be above the object, for example.

This step provides a consistent way of identifying the location of objects as they appear in the 2D image plane. The establishing technique is one that is suitable for being performed automatically without user intervention.

Preferably the two dimensional label images are generated with a size that is dependent on the distance of the associated object as defined within the virtual environment from the viewpoint. That is, objects that are distant with respect to the viewpoint are provided with associated labels generated with a smaller size and objects that are close with respect to the viewpoint are provided with associated labels generated with a larger size. In any case, some sort of visible difference may be provided for near and far labels such as scaling or shading of the text label colour.

Where a scaling parameter is employed in the process of projecting an object from the 3D virtual environment onto the 2D image plane, that scaling parameter may be employed in determining the size of a generated label associated with that object.

The label images may include text data.

Image data treatment may be applied to generated two dimensional label images. Such image data treatment may include standard image processing techniques such as anti aliasing and interlace flicker cancellation. The application of such treatment is generally more effective for labels generated in two dimensions than for labels projected from the 3D virtual environment. Furthermore, where the two dimensional images are generated in an overlay plane, it is possible to apply image treatment only to generated labels and not objects projected onto the 2D image plane simply by applying the treatment just to the overlay plane.

In accordance with a second aspect of the present invention there is provided data processing apparatus configured to generate labels for display with objects defined in a three-dimensional (3D) virtual environment, the objects being presentable on a two dimensional (2D) image plane through projecting those objects onto the 2D image plane in a rendering process, to produce an image that is representative of the 3D environment as observed from a viewpoint, the apparatus including:

object location means for establishing the location of an object as presented in the 2D image plane and assigning an object position reference point relative thereto; and generating means for generating a two dimensional (2D) label image which is associated with the object position reference point and for moving the label image therewith in two dimensions.

Other aspects and optional features of the present invention appear in the appended claims, to which reference should now made and the disclosure of which is incorporated herein by reference.

The present invention will now be described by way of example only with reference to the accompanying drawings in which.

Figure 1:
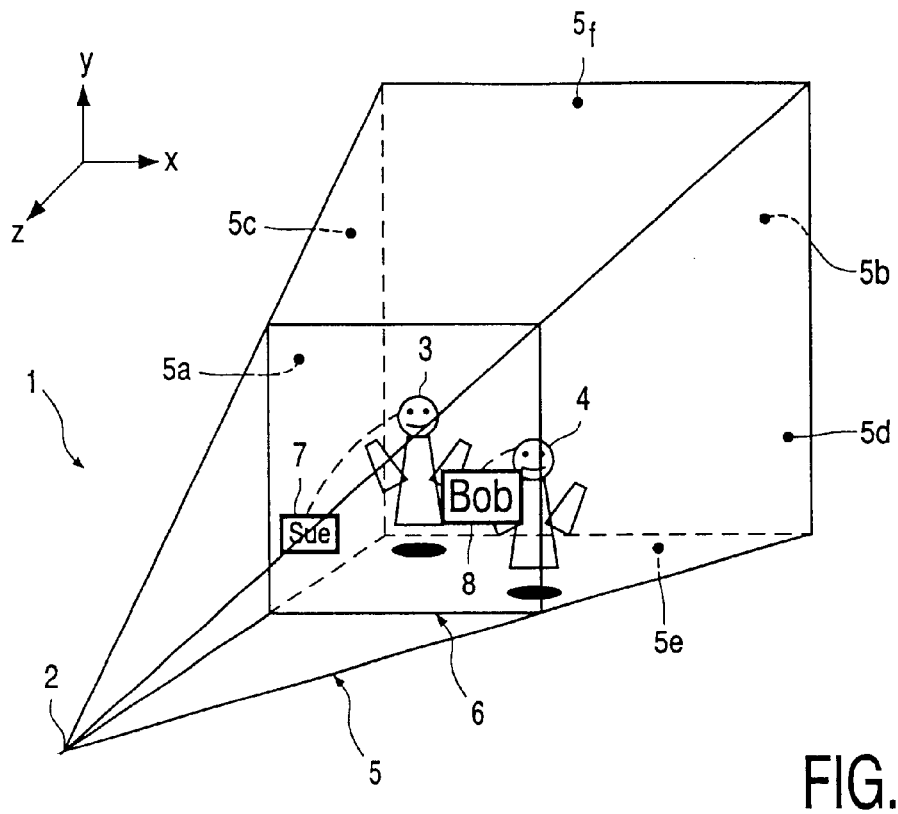
FIG. 1 shows part of a three dimensional virtual environment having objects located therein for representation in two dimensions, the Figure also showing labels.

Referring to FIG. 1, a three dimensional (3D) virtual environment 1 is represented which extends in the directions indicated by axes x, y, z. The 3D virtual environment may contain a number of objects but for the purpose of explaining the present invention two example objects 3 and 4 are shown in FIG. 1. Now assume that the 3D virtual environment is to be observed from a viewpoint indicated by position 2. A view frustum 5 delimits that part of the 3D virtual environment that will be projected onto a 2D image plane in a rendering process to generate an image that is representative of the 3D environment as observed from viewpoint 2. It is this 2D image that provides a user with a view of the 3D environment as he navigates it. The view frustum 5 itself defines a number of planes known as 'clip planes'. In the arrangement shown in FIG. 1 the planes may be designated as the front clip plane 5a, rear clip plane 5b, left clip plane 5c, right clip plane 5d, bottom clip plane 5e and top clip plane 5f. Only that part of the 3D virtual environment enclosed by the clip planes will be rendered onto the 2D image plane although it is stated for the purpose of clarity that the 3D virtual environment extends outside these clip planes. Since only those parts of the 3D virtual environment contained within the clip planes will be represented on the 2D image plane, there is no requirement to perform a rendering operation on those parts of the 3D environment falling outside the clip planes.

The 2D image plane extends only in directions x, y and is denoted by reference numeral 6. It is noted that in this particular example the front clip plane 5a is co-planar with the 2D image plane 6, that is the two planes have the same z co-ordinate. However, this is not a requirement as will be appreciated by the person skilled in the art.

The process of rendering (projecting) a 3D virtual environment onto a 2D image plane to generate a 2D representation of the 3D virtual environment is known to, and may be reproduced by, the person skilled in the art and does not need to be described in further detail here.

Label images may be provided for each object that appears in the 2D image plane. The labels are provided by establishing the location of the object as projected in the 2D image plane 6 and generating a two dimensional label image for display with the object at or near the established location.

By providing the labels in spatial registration with the object they are associated with, this serves to minimise the risk of associating a label with the wrong object when more than one object appears in the 2D image plane. As shown in FIG. 1, object 3 is provided with label 7 and object 4 is provided with label 8. The labels may be positioned with an offset relative to the object they are associated with. If the position at which an object is located in 3D is altered, the location of the label associated with that object is also altered so that the label remains in spatial registration with the object. Thus when an object appears to move in the 2D image plane, the label appears to move with it. The position of an object as represented in the 2D image plane can change either because the object is moving in the 3D virtual environment or because the viewpoint 2 has altered.

The label image is generated in two dimensions from the outset. This is in contrast to the above mentioned known technique of providing objects with labels; that is the technique of providing the labels in the 3D virtual environment itself and rendering the image of those labels from the 3D environment into the 2D image plane together with the rest of the object.

By generating the label images in two dimensions and mapping the label images onto the 2D image plane, the label images always appear in the image plane front on, irrespective of the fact that the object which the label is associated with is viewed from a perspective that is not directly front on.

Since the labels are not provided in the 3D virtual environment itself, data representing the label images is provided separately. A means for matching label image data with individual objects of the 3D virtual world is provided. The labels are likely to be 2D texture maps.

Figure 2:
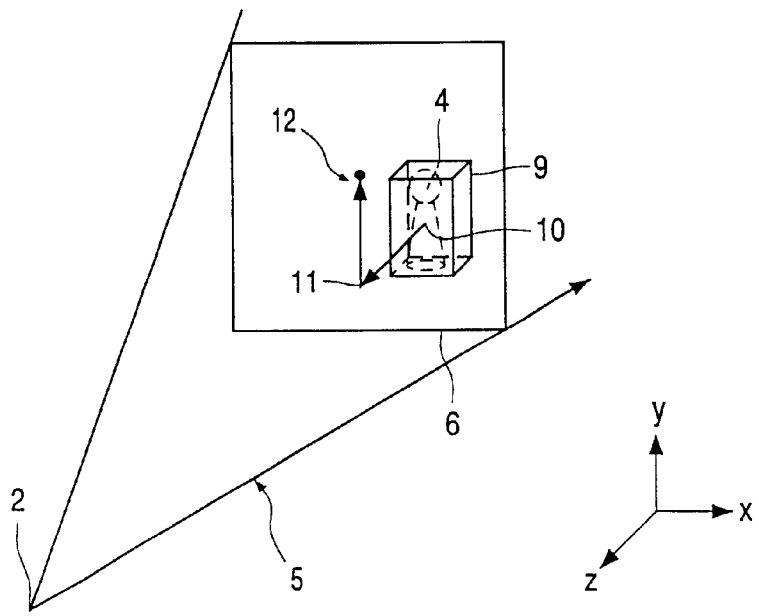
FIG. 2 shows a technique for establishing the location of an object when represented in two dimensions.

The size of the generated labels as mapped onto the 2D image plane may be governed by the distance of their associated object from the viewpoint 2. For example in FIG. 1, within the virtual 3D environment, object 3 is located at a greater distance from viewpoint 2 and object 4 is located at a lesser distance with respect to viewpoint 2. Assuming that objects 3 and 4 are of the same size as each other in the context of the virtual environment, then when object 4 is projected onto the 2D image plane it will appear larger than the projection of object 3. To complement this perspective effect, the associated labels are generated with a size appropriate to the size of the object as perceived in the 2D image plane. This is illustrated in FIG. 1 where the label 8 associated with object 4 is larger than label 7 associated with object 3. For each object rendered onto the 2D image plane, a reference point indicating the location of that object in the 2D image plane is provided so that a label associated with the object may be located relative to this reference point. One way of providing such a reference point in the context of VRML is explained with reference to FIG. 2. (VRML is the so-called Virtual Reality Modelling Language as described, for example, in the VRML standard, version 2.0, issued as ISO/IEC WD14772 on Aug. 4, 1996. VRML is a file format for describing interactive three-dimensional worlds to be experienced on the Internet/World Wide Web). Object 4 is shown in FIG. 2 in the 3D virtual environment but with a so-called bounding box 9 applied to it. A bounding box is a minimum rectangular volume that can contain an object. A part of this bounding box (for example a part 10 that represents it's centre) is selected for projection onto the 2D image plane to provide reference point 11. The actual label may be generated at a location offset from this reference point 11 and the effect of this offset results in location 12 being selected for positioning the label.

The label images may include text data, for example in the form of a name to indicate the identity of the object that the label is associated with, or even dynamically changing text indicative of the status of the object. The label could present scrolling text data.

An alternative to mapping generated text labels onto the 2D image plane is to provide a further two dimensional overlay plane within which the text labels are generated. The term 'overlay' is used to indicate that any image generated in the overlying plane is dominant in the sense that a label generated in this plane will obscure those portions of the 2D image in the underlying image plane in regions of overlap. However, in the model of FIG. 1, the 2D image plane and the overlying plane may be considered as coplanar.

Such an overlay plane is provided in the form of the so-called 'overlay plane' in the Philips TriMedia multimedia microprocessor.

The label images generated in 2D lend themselves to image processing techniques such as anti-aliasing and cancellation of interlace flicker. Where the images are generated in their own plane, such as the overlay plane, it is possible to selectively apply the image processing techniques only to the 2D label images, without affecting the appearance of the 3D objects as rendered in the 2D image plane.

Figure 3:
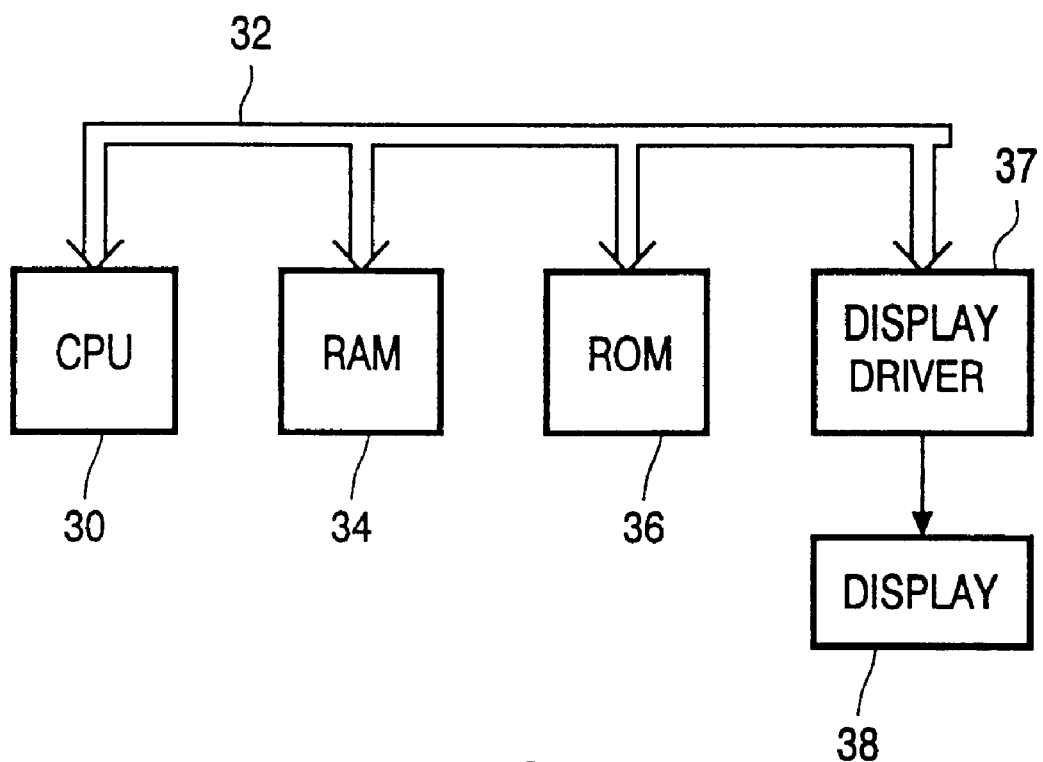
FIG. 3 is a schematic representation of a system suitable for carrying out the present invention.

Referring to FIG. 3 a system for performing the present invention includes a central processing unit (CPU) 30 coupled via an address and data bus 32 to random-access (RAM) and read-only (ROM) memory devices 34, 36. The capacity of these memory devices may be augmented by providing the system with access to storage in the form of magnetic disks or the like. Video output for display of the rendered 2D image plane and generated labels (whether as mapped on to the image plane or produced in a separate overlying plane) is presented on display screen 38 driven by display driver stage 37 under the control of CPU 30.

From reading the present disclosure other modifications will be apparent to the person skilled in the art. Such modifications may involve other features which are already known in the design, manufacture and use of systems and devices and component parts thereof and which may be used instead of or in addition to features already described herein.

What is claimed is:

1. A method of providing labels for an object defined in a three-dimensional (3D) virtual environment, the objects being presented on a two dimensional (2D) image plane through projecting the objects onto the 2D image plane in a rendering process, to generate an image that is representative of the 3D environment as observed from a viewpoint, said method comprising the steps of:
    establishing a location for the object as presented in the 2D image plane and assigning an object position reference point relative thereto by providing a bounding box sized to surround the object as defined in the 3D virtual environment, establishing a part of the bounding box, and projecting the location of the part onto the 2D image plane in a rendering process to generate a position therein that is representative of the object location as observed from the viewpoint; and
    generating a two dimensional (2D) label image which is associated with the object position reference point and movable therewith in two dimensions.

2. A method in accordance with claim 1 and further comprising the step of generating the two dimensional label image in a two dimensional overlay plane which overlays the image plane.

3. A method in accordance with claim 2 and further comprising the step of generating the two dimensional label image with a size that is dependent on the distance of the associated object as defined within the virtual environment from the viewpoint.

4. A method in accordance with claim 2 and further comprising the step of adopting any size scaling parameter applied to an object during the projection of that object from the 3D virtual environment onto the 2D image plane and applying that parameter when generating the 2D associated label image to govern the size thereof.

5. A method in accordance with claim 2 and further comprising the step of applying image data treatment to generated two dimensional label image without affecting the appearance of the 3D object as rendered in the 2D image plane.

6. A method in accordance with claim, 5 wherein the applied image data treatment includes anti-aliasing treatment or treatment directed towards the cancellation of interlace flicker, or both.

7. A method in accordance with claim 1 and further comprising the step of introducing an offset to the position representative of the object location as observed from the viewpoint.

8. A method in accordance with claim 1 and further comprising the step of generating the two dimensional label image with a size that is dependent on the distance of the associated object as defined within the virtual environment from the viewpoint.

9. A method in accordance with claim 1 and further comprising the step of adopting any size scaling parameter applied to an object during the projection of that object from the 3D virtual environment onto the 2D image plane and applying that parameter when generating the 2D associated label image to govern the size thereof.

10. A method in accordance with claim 1 wherein the label image includes text data.

11. A method in accordance with claim 1 and further comprising the step of applying image data treatment to the generated two dimensional label images without affecting the appearance of the 3D object as rendered in the 2D image plane.

12. A method in accordance with claim 11 wherein the applied image data treatment includes anti-aliasing treatment or treatment directed towards the cancellation of interlace flicker, or both.

13. A method in accordance with claim 1, wherein:
    the part of the bounding box is the center of the bounding box.

14. A method in accordance with claim 1, wherein:
    the bounding box is a minimum rectangular volume that contains the object.

15. A data processing apparatus configured to generate a labels for display with an objects defined in a three-dimensional (3D) virtual environment, the objects being presentable on a two dimensional (2D) image plane through projecting the object onto the 2D image plane in a rendering process, to produce an image that is representative of the 3D environment as observed from a viewpoint, the apparatus including:
    object location means for establishing the location of the object as presented in the 2D image plane and assigning an object position reference point relative thereto by providing a bounding box sized to surround the object as defined in the 3D virtual environment, establishing a part of the bounding box, and projecting the location of the part onto the 2D image plane in a rendering process to generate a position therein that is representative of the object location as observed from the viewpoint; and
    generating means for generating a two dimensional (2D) label image which is associated with the object position reference point and for moving the label image therewith in two dimensions.

16. The data processing apparatus of claim 15, wherein:
    the part of the bounding box is the center of the bounding box.

17. The data processing apparatus of claim 15, wherein:
    the bounding box is a minimum rectangular volume that contains the object.

* * * * *